United States Patent
Schmalzl

(10) Patent No.: US 9,735,812 B2
(45) Date of Patent: Aug. 15, 2017

(54) DIGITAL RF RECEIVER POWER SAVING WITH SIGNAL QUALITY DEPENDENT WORD LENGTH REDUCTION

(71) Applicant: Intel IP Corporation, Santa Clara, CA (US)

(72) Inventor: Stefan Helmut Schmalzl, Sauerlach (DE)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 14/751,793

(22) Filed: Jun. 26, 2015

(65) Prior Publication Data

US 2016/0380655 A1 Dec. 29, 2016

(51) Int. Cl.
*H04B 1/04* (2006.01)
*H04B 1/00* (2006.01)
*H04W 52/02* (2009.01)

(52) U.S. Cl.
CPC ......... *H04B 1/0475* (2013.01); *H04B 1/0014* (2013.01); *H04W 52/0209* (2013.01); *Y02B 60/50* (2013.01)

(58) Field of Classification Search
CPC ...................................................... H04L 27/26
See application file for complete search history.

(56) References Cited

U.S. PATENT DOCUMENTS

| | | | | |
|---|---|---|---|---|
| 9,059,742 | B1* | 6/2015 | Anderson | H03M 13/1111 |
| 2007/0276647 | A1* | 11/2007 | Cullen | G06F 8/443 |
| | | | | 703/22 |
| 2009/0023404 | A1* | 1/2009 | Leinonen | H04B 1/1036 |
| | | | | 455/114.2 |
| 2009/0063911 | A1* | 3/2009 | Tsukio | H04L 27/2647 |
| | | | | 714/708 |
| 2012/0169519 | A1* | 7/2012 | Ugur | H04N 19/91 |
| | | | | 341/55 |
| 2014/0105325 | A1* | 4/2014 | Huang | H04L 27/2649 |
| | | | | 375/296 |
| 2015/0244491 | A1* | 8/2015 | Montorsi | H04L 1/001 |
| | | | | 370/474 |

OTHER PUBLICATIONS

Rosu. "Automatic Gain Control (AGC) in Receivers." Y03DAC/VA31UL—http:/www.qsl.net.va3iul, 9 pages.

(Continued)

*Primary Examiner* — Jaison Joseph
(74) *Attorney, Agent, or Firm* — Eschweiler & Potashnik, LLC

(57) ABSTRACT

A radio frequency (RF) transceiver system comprises an input port configured to receive an RF receive signal and a receiver (RX) digital signal processing (DSP) unit configured to process a digital IF signal based on the RF receive signal and generate a processed digital IF signal at an output port based thereon. Further, the RF transceiver system comprises a digital interface unit comprising a digital interface configured to convey the processed digital IF signal from the output port. In addition, the RF transceiver system comprises a quality estimation unit configured to estimate a quality indicator of the RF receive signal or a signal associated therewith, and dynamically adapt a digital transmission word length of the processed digital IF signal over the digital interface, based on the estimated quality indicator.

10 Claims, 9 Drawing Sheets

(56) References Cited

OTHER PUBLICATIONS

Lee, et al. "Fine Grain Word Length Optimization for Dynamic Precision Scaling in DSP Systems." Department of Electrical and Computer Engineering, The University of Texas at Austin, 6 pages.
"Digital Audio Basics: Sample Rate and Bit Depth." PreSonus-Articles—Digital Audio Basics: Sample Rate and Bit Depth, 2 pages.
Sung et al. "Simulation-Based Word-Length Optimization Method for Fixed-Point Digital Signal Processing Systems." IEEE Transactions on Signal Processing, vol. 43, No. 12, Dec. 1995, pp. 3087-3090.
"Dynamic Precision Scaling for Low Power WCDMA Receiver." IEEEXplore Digital Library, 2011, pp. 1-13.
Nguyen et al. "Dynamic precision scaling for low power WCDMA receiver." IRISA/INRIA, University of Rennes 1, ISCAS 2009, 22 pages.
Yoshizawa, Shingo, et al. "Use of a Variable Wordlength Technique in an OFDM Receiver to Reduce Energy Dissipation." 2007 IEEE International Symposium on Circuits and Systems. pp. 3175-3178.

\* cited by examiner

| Wanted Input Signal Level [dBm] | Digital Transmission Word Length |
|---|---|
| <-91 | 6 |
| -85 | 7 |
| -80 | 8 |
| -70 | 9 |
| >-70 | 10 |

DIGITAL RF RECEIVER POWER SAVING WITH SIGNAL QUALITY DEPENDENT WORD LENGTH REDUCTION

FIELD

The present disclosure relates to digital radio receivers and, in particular to signal to noise and distortion ratio (SNDR) dependent word length reduction in digital radio receivers.

BACKGROUND

Power consumption continues to be an important aspect of Digital Signal Processing (DSP) systems. Wireless communication domain is an important sector for Digital Signal Processing (DSP) applications. Most wireless terminals are supplied by battery. The design of low power terminals is one of the key challenges in this domain. New services are provided (image, video, Internet access) and require high data rate. Consequently, the complexity of the baseband digital part is growing. However, the energy consumption cannot be increased due to the limited battery lifetime. Thus, new strategies to reduce or maintain the energy consumption power at a reasonable level must be proposed.

The energy consumption of an application depends on the word-length of the manipulated data. The energy consumption can be reduced by decreasing the data wordlength. Nevertheless, this also reduces the computation accuracy and increases the unavoidable error due to finite word-length computation. In traditional design of DSP systems, fixed word lengths optimized for optimum performance in high signal quality scenarios are used. However, the system is often noise and/or interferer limited which leads to a signal quality which is way lower than optimum and hence in such scenarios, word length can be reduced without major impact on the overall signal quality.

BRIEF DESCRIPTION OF THE DRAWINGS

Some examples of circuits, apparatuses and/or methods will be described in the following by way of example only. In this context, reference will be made to the accompanying Figures.

FIG. 6a shows a graph showing a comparison of the SNDR of a received signal with fixed quantization and adaptive quantization, for example, in the radio receiver system 200 of FIG. 2a.

FIG. 6b shows an example implementation of the look up table 231 of FIG. 2a derived based on the graph of FIG. 6a.

DETAILED DESCRIPTION

Figure 1:
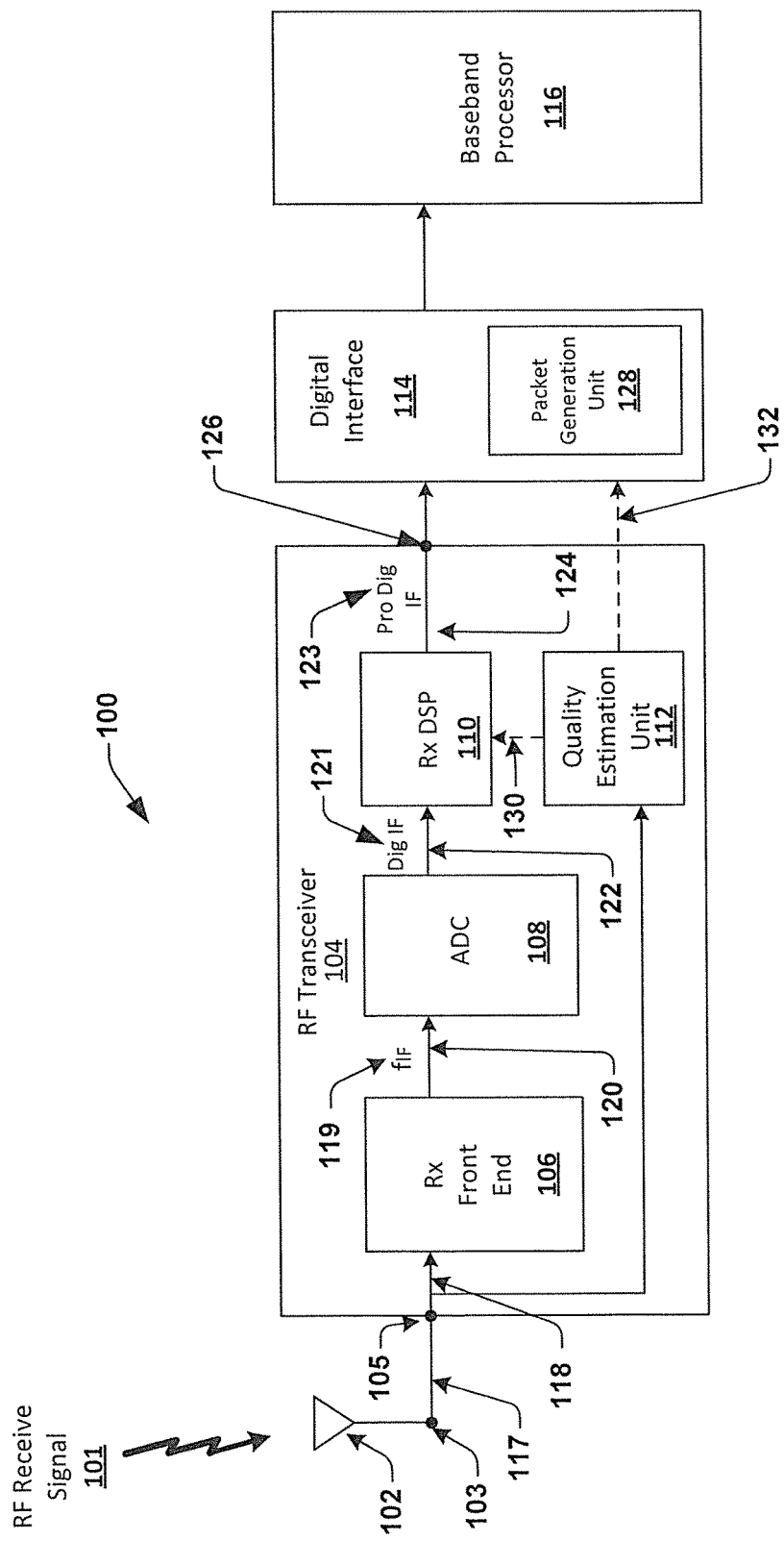
FIG. 1 shows a simplified block diagram of a radio receiver system having dynamic word length adaptation, according to one embodiment of the disclosure.

In one embodiment of the disclosure, a radio frequency (RF) transceiver system comprises an input port configured to receive and process an RF receive signal. Further, the RF transceiver system comprises a receiver (RX) digital signal processing (DSP) unit configured to process a digital IF signal based on the RF receive signal and generate a processed digital IF signal at an output port based thereon. The RF transceiver system further comprises a digital interface unit comprising a digital interface configured to convey the processed digital IF signal from the output port. In addition, the RF transceiver system comprises a quality estimation unit configured to estimate a quality indicator of the RF receive signal or a signal associated therewith, and dynamically adapt a digital transmission word length of the processed digital IF signal over the digital interface, based on the estimated quality indicator.

In another embodiment of the disclosure, a radio frequency (RF) transceiver system comprises an input port configured to receive and process an RF receive signal. Further, the RF transceiver system comprises a RX digital signal processing (DSP) unit configured to process a digital IF signal based on the RF receive signal and generate a processed digital IF signal at an output port based thereon. The RF transceiver system further comprises a digital interface unit comprising a digital interface configured to convey the processed digital IF signal from the output port. In addition, the RF transceiver system comprises a quality estimation unit configured to estimate a quality indicator of the RF receive signal or a signal associated therewith, and dynamically adapt a DSP word length of the digital IF signal used in the Rx DSP unit, based on the estimated quality indicator.

In another embodiment of the disclosure, a method comprises receiving and processing an RF receive signal to form a digital IF signal at an RF front end unit. Further, the method comprises processing the digital IF signal to generate a processed digital IF signal at a Rx digital signal processing (DSP) unit. In addition, the method comprises dynamically adapting a digital transmission word length of the processed digital IF signal for subsequent transmission over a digital interface, based on a quality indicator of the RF receive signal or a signal associated therewith and transmitting the processed digital IF signal over the digital interface.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "unit," "element," and the like are intended to refer to a computer-related entity, hardware, software (e.g., in execution), and/or firmware. For example, a unit can be a processor, a process running on a processor, a controller, an object, an executable program, a storage device, and/or a computer with a processing device. By way of illustration, an application running on a server and the server can also be a unit. One or more units can reside within a process, and a unit can be localized on one computer and/or distributed between two or more computers. A set of elements or a set of other units can be described herein, in which the term "set" can be interpreted as "one or more."

As another example, a unit can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a unit can be an apparatus that provides specific functionality through electronic components without mechanical parts; the electronic components can include one or more processors therein to execute software and/or firmware that confer(s), at least in part, the functionality of the electronic components.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

In the following description, a plurality of details is set forth to provide a more thorough explanation of the embodiments of the present disclosure. However, it will be apparent to one skilled in the art that embodiments of the present disclosure may be practiced without these specific details. In other instances, well-known structures and devices are shown in block diagram form rather than in detail in order to avoid obscuring embodiments of the present disclosure. In addition, features of the different embodiments described hereinafter may be combined with each other, unless specifically noted otherwise.

As indicated above, power consumption continues to be an important aspect of radio receiver systems. Current designs of DSP systems use fixed word length optimized for optimum performance in high signal quality scenarios. However, the signal quality of an input signal varies with the environmental conditions. For example, in urban scenarios, the radio link is very often noise or interferer limited leading to a signal quality which is way lower than the optimum. In such scenarios, received input signal power is usually low and is dominated by thermal noise, thereby deteriorating the signal quality of the received input signal. In such instances, the word length of the received input signal can be reduced without major impact on the overall signal quality. The reduction in word length in turn results in saving power in radio receiver systems. This disclosure presents an efficient approach of saving power in digital radio receivers while maintaining signal quality. In particular, in one embodiment, the disclosure presents an approach of saving power in digital radio receivers by dynamically adapting a digital transmission word length over a digital connection between a transceiver and a baseband processor based on a RF transceiver's knowledge of current signal to noise and distortion ratio (SNDR) scenario. Further, in another embodiment, the disclosure presents an approach of saving power in digital radio receivers by dynamically adapting a DSP word length in a DSP section of the digital radio receiver based on a RF transceiver's knowledge of current signal to noise and distortion ratio (SNDR) scenario. In both embodiments, power savings are achieved by dynamically adapting word lengths to a time-varying signal quality environment.

In the following description, examples will be described and explained in more detail with respect to power saving in digital RF receivers with SNDR dependent word length reduction. In particular, in one embodiment, a radio receiver system having a quality estimation unit configured to estimate a power of a receive signal and thereby dynamically change a digital transmission word length is described. Further, in another embodiment, a radio receiver system having a quality estimation unit configured to estimate a power of a receive signal and thereby dynamically change a digital transmission word length as well as a DSP word length is described.

FIG. 1 depicts a simplified block diagram of a radio receiver system 100 according to one embodiment of the disclosure. The radio receiver system 100 comprises an antenna port 103, an RF transceiver unit 104, a digital interface unit 114 and a baseband processor unit 116. The antenna port 103 is configured to receive an RF receive signal 101 at RF frequency $f_{RF}$ from the antenna 102. The system 100 further comprises an antenna signal path 117 configured to convey the RF receive signal 101 from the antenna port 103 to an input port 105 of the RF transceiver unit 104. The RF transceiver unit 104 further comprises a receiver (Rx) front end unit 106, an analog to digital converter (ADC) unit 108, an Rx DSP unit 110 and a quality estimation unit 112. In addition, the RF transceiver unit 104 comprises a first signal path 118 configured to convey the RF receive signal 101 at an RF frequency $f_{RF}$ from the input port 105 to the Rx front end unit 106. Further the RF transceiver unit 104 comprises a second signal path 120 configured to convey an intermediate frequency (IF) signal 119 at IF frequency $f_{IF}$ from an output of the Rx front end unit 106 to the ADC unit 108 and a third signal path 122 configured to convey a digital IF signal 121 at an output of the ADC unit 108 to the Rx DSP unit 110. In some embodiments, the IF frequency $f_{IF}$ is equal to or close to zero. Furthermore, the RF transceiver unit 104 comprises a fourth signal path 124 configured to convey a processed digital IF signal 123 at an output of the Rx DSP unit 110 to the output port 126 of the RF transceiver unit 104. In some embodiments, the digital interface unit 114 can be a part of the RF transceiver unit 104.

The RF transceiver unit 104 is located downstream of the antenna port 103 and the Rx front end unit 106 within the RF transceiver unit 104 is configured to receive the RF receive signal 101 from the antenna port 103 through the input port 105 of the RF transceiver unit 104. The Rx front end unit 106 is further configured to down convert the RF receive signal 101 to the IF signal 119. In some embodiments, the Rx front end unit 104 can comprise amplifiers, filters, mixers etc. configured to process the RF receive signal 101. In one example, the Rx front end unit 106 comprises a mixer (not shown) configured to down convert the RF receive signal 101 to the IF signal 119. The ADC unit 108 is located downstream of the Rx front end unit 106, within the RF transceiver unit 104 and is configured to receive the IF signal 119 from an output of the Rx front end unit 106 via the second signal path 120. Further, the ADC unit 108 is configured to digitize the IF signal 119 in the second signal path 120 to form the digital IF signal 121 at an output of the ADC unit 108. The digital IF signal 121 is then conveyed to the Rx DSP unit 110 via the third signal path 122.

The Rx DSP unit 110 is located downstream of the ADC unit 108 and is configured to process the digital IF signal 121 in the third signal path 122, and form the processed digital IF signal 123 at an output of the Rx DSP unit 110. The processed digital IF signal 123 is then conveyed to the baseband processor unit 116 via the digital interface unit 114. In some embodiments, the Rx DSP unit 110 can comprise down sampling units, filters, cordics, fractional sample rate converters etc.

The quality estimation unit 112 is located within the RF transceiver unit 104 and is configured to dynamically adapt a digital transmission word length of the processed digital IF signal 123 via a signal path 132, based on an estimation of a quality indicator of the processed digital IF signal 123. In some embodiments, the quality estimation unit 112 is further configured to dynamically adapt a DSP word length of the digital IF signal 121 in the Rx DSP unit 110 via a signal path 130 based on an estimation of a quality indicator of the digital IF signal 121. In some embodiments, a power measurement of the RF receive signal 101 is used to dynamically adapt the digital transmission word length or the DSP word length by selecting a word length from a plurality of word lengths in a look up table within the quality estimation unit 112. In one embodiment, the quality estimation unit 112 comprises a first lookup table comprising a plurality of digital transmission word lengths associated with a plurality of power levels determined based on the quality indicator of the processed digital IF signal 123. Further, the quality estimation unit 112 comprises a second lookup table comprising a plurality of DSP word lengths associated with a plurality of power levels determined based on the quality indicator of the digital IF signal 121. It is hereby ascertained that a power level of the RF receive signal 101 correlates with the quality indicator of the processed digital IF signal 123 and quality indicator of the digital IF signal 121, and can be used as a convenient measure to adapt the digital transmission word length of the processed digital IF signal 123 or the DSP word length of the digital IF signal 121. Therefore, the digital transmission word length of the processed digital IF signal 123 can be adapted herein by dynamically selecting a digital transmission word length from the plurality of digital transmission word lengths in the first lookup table based on the measured power of the RF receive signal 101. Similarly, the DSP word length of the digital IF signal 121 can be adapted herein by dynamically selecting a DSP word length from the plurality of DSP word lengths in the second lookup table based on the measured power of the RF receive signal 101.

In some embodiments, the quality indicator comprises a signal to noise and distortion ratio (SNDR), however, in other embodiments, the quality indicator can be any signal quality measure. The adaptation of the digital transmission word length can be done independent of the adaptation of the DSP word length. In some embodiments, the adaptation of the digital transmission word length over the digital interface unit 114 and the adaptation of the DSP word length in the Rx DSP unit 110 are implemented simultaneously. In some embodiments, the adaptation of the word length can be implemented using a digital HW block within the transceiver unit. For example, a 10 bit→7 bit compression can be achieved by removing 3 LSB by logical right shift operation in the digital HW block. Once the digital transmission word length or the DSP word length or both are adjusted, in some embodiments, information on the used digital transmission word length or the DSP word length or both are also transmitted from the quality estimation unit 112 to the baseband processor 116 over the digital interface unit 114.

As indicated above, current solutions use fixed word length for signal transmission over an interface using a protocol, for example, a DigRF protocol. In some embodiments, the adaptation of the digital transmission word length is performed by modifying an existing protocol, for example, by extending the DigRF protocol or by using a different protocol. In some embodiments, the digital interface unit 114 further comprises a packet generation unit 128 configured to generate in-phase/quadrature (IQ) data packets from the data to be conveyed to the baseband processor unit 116. However, other modes of data transfer are also contemplated as falling within the scope of the present disclosure. In some embodiments, the IQ data packets comprise a data header that includes the information on the used digital transmission word length. Further, in some embodiments, adaptation of the word length is achieved by allowing flexible IQ packet lengths by modifying the DigRF protocol.

Figure 2A:
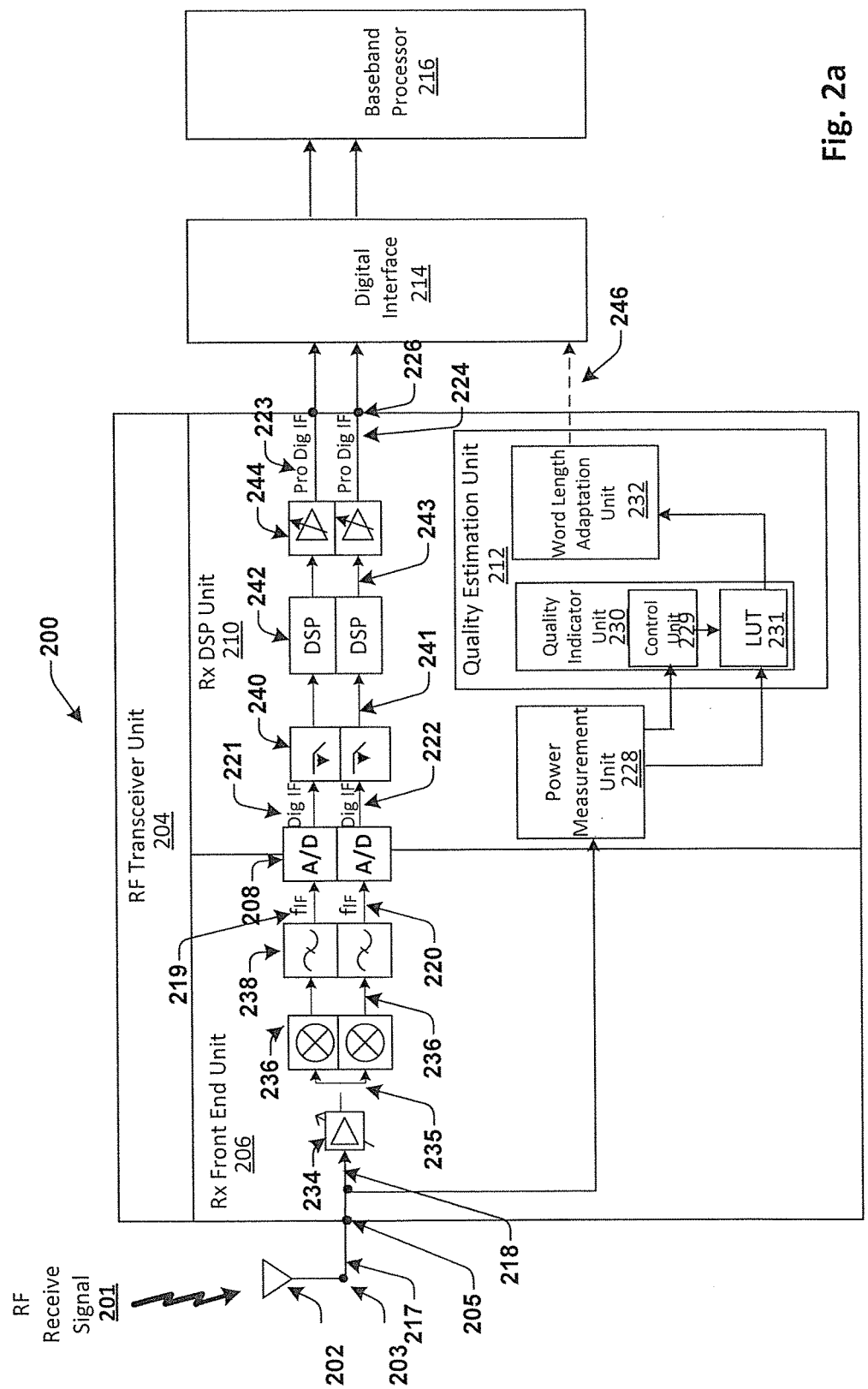
FIG. 2a shows a schematic diagram of an example implementation of a radio receiver system for dynamically adapting a digital transmission word length, according to one embodiment of the disclosure.

FIG. 2a depicts an example implementation of a radio receiver system 200 for dynamically adapting a digital transmission word length, according to one embodiment of the disclosure. The radio receiver system 200 comprises an antenna port 203, an RF transceiver unit 204, a digital interface unit 214 and a baseband processor unit 216. The antenna port 203 is configured to receive an RF receive signal 201 at RF frequency $f_{RF}$ from the antenna 202. The system 200 further comprises an antenna signal path 217 configured to convey the RF receive signal 201 from the antenna port 203 to an input port 205 of the RF transceiver unit 204. The RF transceiver unit 204 is located downstream of the antenna port 203 and further comprises a receiver (Rx) front end unit 206, an analog to digital converter (ADC) unit 208, an Rx DSP unit 210, a power measurement unit 228 and a quality estimation unit 212. In addition, the RF transceiver unit 204 comprises a first signal path 218 configured to convey the RF receive signal 201 at an RF frequency $f_{RF}$ from the input port 205 to the Rx front end unit 206. Further the RF transceiver unit 204 comprises a second signal path 220 configured to convey an intermediate frequency (IF) signal 219 at IF frequency $f_{IF}$ from an output of the Rx front end unit 206 to the ADC unit 208 and a third signal path 222 configured to convey a digital IF signal 221 at an output of the ADC unit 208 to the Rx DSP unit 210. Furthermore, the RF transceiver unit 204 comprises a fourth signal path 224 configured to convey a processed digital IF signal 223 at an output of the Rx DSP unit 210 to the output port 226 of the RF transceiver unit 204. In some embodiments, each of the second signal path 220, third signal path 222 and the fourth signal path 224 comprises I-Q (in-phase/quadrature) signal paths comprising an I-path and a Q-path.

The Rx front end unit 206 within the RF transceiver unit 204 is configured to receive the RF receive signal 201 from the input port 205 of the RF transceiver unit 204 via the first signal path 218. In one embodiment, the RF front end unit 206 comprises an RF amplifier 234 configured to amplify the RF receive signal 201 at an input of the RF front end unit 206 and generate an amplified RF receive signal 235. Further, the Rx front end unit 206 comprises a mixer component, for example, an I-Q demodulator configured to down convert the amplified RF receive signal 235 to generate a down converted RF receive signal 236. In addition, the Rx front end unit 206 comprises an gain/filter component 238 configured to process the down converted RF receive signal 236 to generate the IF signal $f_{IF}$ 219 at an output of the Rx front end unit 206.

The ADC unit 208 is located downstream of the Rx front end unit 206, within the RF transceiver unit 204 and is configured to receive the IF signal 219 from the output of the Rx front end unit 206 via the second signal path 220. Further, the ADC unit 208 is configured to digitize the IF signal 219 in the second signal path 220 to form the digital IF signal 221 at an output of the ADC unit 208. The digital IF signal 221 is then conveyed to an input of the Rx DSP unit 210 via the third signal path 222.

The Rx DSP unit 210 is located downstream of the ADC unit 208 and is configured to process the digital IF signal 221 in the third signal path 222, and form the processed digital IF signal 223 at an output of the Rx DSP unit 210. In one embodiment, the Rx DSP unit 210 comprises a down sampling unit 240 configured to change the sampling rate of the digital IF signal 221 to generate a sampled digital IF signal 241, a DSP component 242 comprising filters, cordics, sample rate converters etc. configured to process the sampled digital IF signal 241 to generate a processed signal 243 and an amplifier unit 244 configured to amplify the processed signal 243 to generate the processed digital IF signal 223 at an output of the Rx DSP unit 210. The processed digital IF signal 223 is then conveyed to the output port 226 of the RF transceiver unit 204 via the fourth signal path 224. The baseband processor unit 216 is located downstream of the RF transceiver unit 204 and is configured to receive the processed digital IF signal 223 via the digital interface unit 214.

The quality estimation unit 212 is located within the RF transceiver unit 204 and is configured to dynamically adapt a digital transmission word length of the processed digital IF signal 223 based on an estimation of a quality indicator of the processed digital IF signal 223. The quality estimation unit 212 comprises a quality indicator unit 230 comprising a look up table 231 comprising a plurality of predetermined digital transmission word lengths associated with a plurality of power levels of the RF receive signal 201. In some embodiments, the entries of the lookup table 231 are determined based on a quality indicator, for example, SNDR of the processed digital IF signal 223. The quality indicator unit 230 further comprises a control unit 229 configured to determine the quality indicator of the processed digital IF signal 223 and further determine the entries of the look up table 231 based on the determined quality indicator. Further, the quality estimation unit 212 comprises a word length adaptation unit 232 configured to dynamically adapt a digital transmission word length of the processed digital IF signal 223 via a signal path 246, by selecting a digital transmission word length from the plurality of predetermined digital transmission word lengths in the look up table 231, based on a power of the RF receive signal 201 measured in the power measurement unit 228. The power measurement unit 228 is configured to measure a power of the RF receive signal 201 in the first signal path 218. In some embodiments, the power measurement unit 228 is also configured to measure a power of the digital IF signal 221 in the third signal path 222, sampled digital IF signal 241, the processed signal 243 or the processed digital IF signal 223 in the fourth signal path 224. In some embodiments, the power measurement unit 228 comprises an automatic gain control circuit (AGC).

In some embodiments, the quality estimation unit 212 is configured to operate in two phases, namely a design phase and an operation phase. In the design phase, the quality estimation unit 212 is configured to determine the plurality of predetermined digital transmission word lengths associated with a plurality of power levels of the RF receive signal 201, that form the entries of the look up table 231. Thus, the design phase involves populating or updating the look up table 231. To achieve this, in one embodiment, the word length adaptation unit 232 successively tunes the word length of the processed digital IF signal to a plurality of different word lengths to form a plurality of tuned processed IF signals. The control unit 229 within the quality indicator unit 230 then determines a quality indicator (i.e., SNDR) of each of the plurality of tuned processed IF signals. The control unit 229 then compares the quality indicator of each of the plurality of tuned processed IF signals to a quality indicator of the processed digital IF signal 223 for various power levels and determines a desired word length for each of the plurality of power levels of the RF received signal 201 based on the comparison. The design phase is usually performed (i.e., the entries of the lookup table 231 are determined) by the quality estimation unit 212 before the radio receiver system 200 is put into operation. Further, the design phase may subsequently be performed on a periodic or user-defined basis.

During runtime, the quality estimation unit 212 operates in the operation phase. In the operation phase, the power measurement unit 228 measures a power of the RF receive signal 201 and the word length adaptation unit 232 dynamically adapts the digital transmission word length of the processed digital IF signal 223 by selecting a digital transmission word length from the plurality of digital transmission word lengths in the lookup table 231, based on the measured power of the RF receive signal 201 in the power measurement unit 228. Once a digital transmission word length is selected, the quality estimation unit 212 re-enters the operation phase after a predetermined time interval. Note that in the present example, a power measurement is made that correlates with an estimated SNDR. In other embodiments, various parameters may be monitored that correlate with SNDR or alternatively SNDR measurements and calculations may be made, and all such variations are contemplated as falling within the scope of the present disclosure.

Figure 2B:
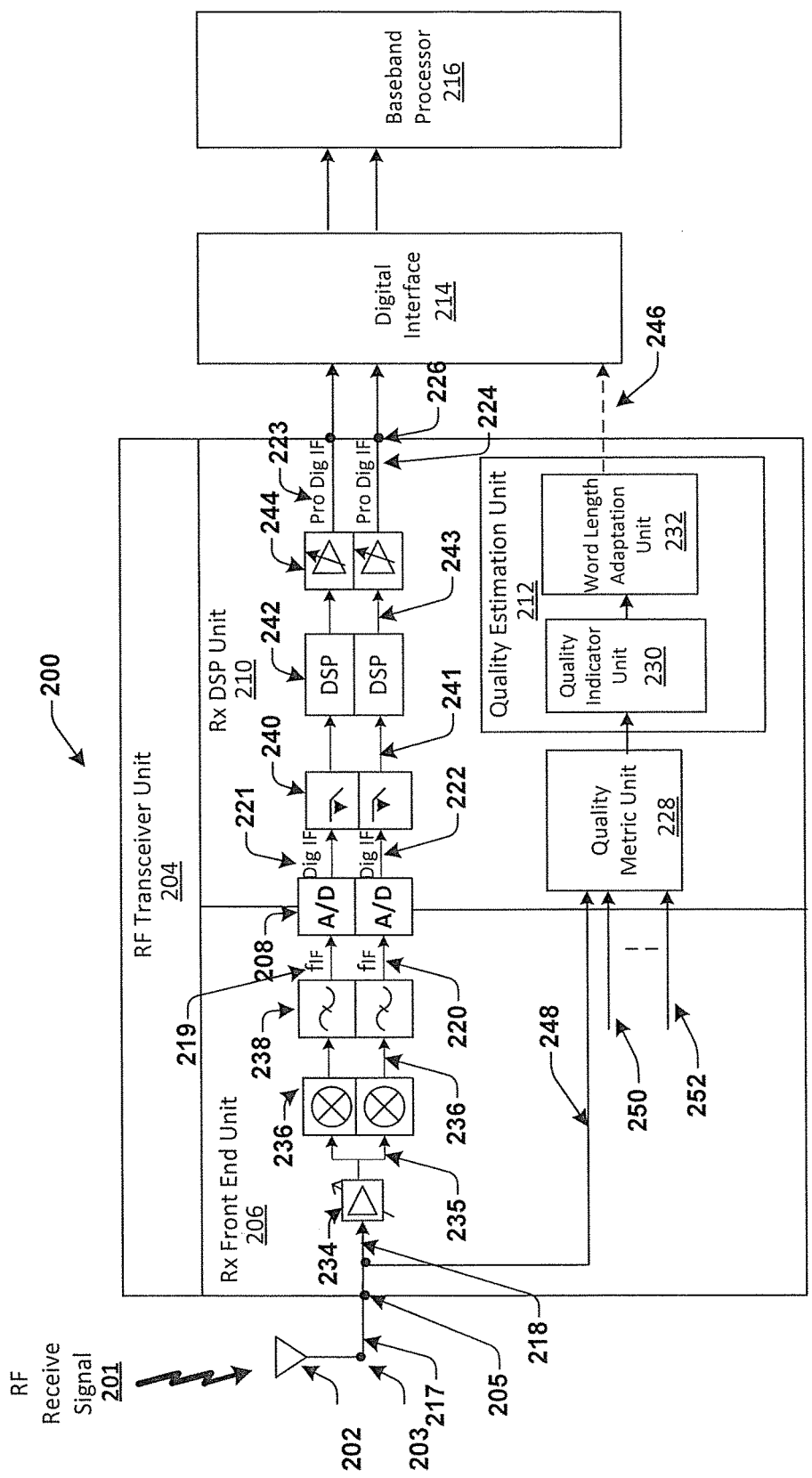
FIG. 2b shows a schematic diagram of an example implementation of a radio receiver system for dynamically adapting a digital transmission word length, according to another embodiment of the disclosure.

In some embodiments, the power measurement unit 228 in FIG. 2a comprises a quality metric unit 228 as shown in FIG. 2b. The radio receiver system 200 in FIG. 2b is a duplicate version of the radio receiver system 200 in FIG. 2a, with a quality metric unit 228 in place of the power measurement unit 228. The quality metric unit 228 comprises one or more inputs, for example, 248, 250 and 258 configured to receive a plurality of signal quality metrics. In one embodiment, the input 248 is configured to receive the RF receive signal 201, similar to the power measurement unit 228 in FIG. 2a. Further, the input 250 is configured to receive the requested transceiver gain from the baseband processor 216 and the input 252 is configured to receive information on used modulation scheme from the baseband processor. Although the different signal quality metrics are obtained from different sections of the radio receiver system 200, all of them correlates to the quality indicator of the RF receive signal 201. The quality indicator unit 230 within the quality estimation unit 212 is then configured to derive an algorithm that maps the signal quality metrics to a digital transmission word length based on one or more of the RF receive signal power, the requested transceiver gain or the used modulation scheme. In one embodiment, the algorithm is implemented using a lookup table approach as explained above with respect to FIG. 2a. However, in other embodiments, other methods of implementations are also possible.

Figure 3:
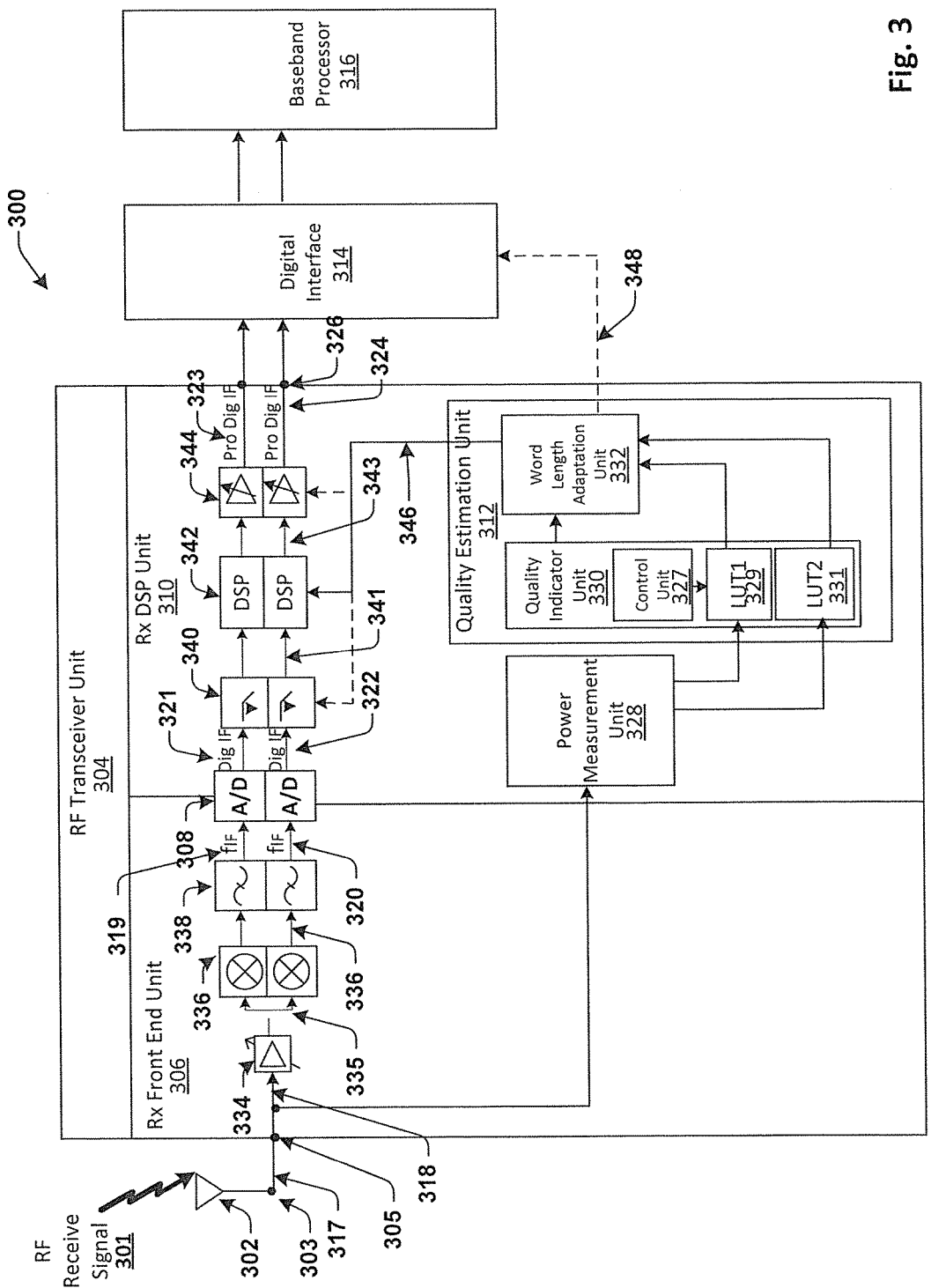
FIG. 3 shows a schematic diagram of an example implementation of a radio receiver system for dynamically adapting a digital transmission word length as well as a DSP word length, according to another embodiment of the disclosure.

FIG. 3 depicts an example implementation of a radio receiver system 300 for dynamically adapting a digital transmission word length as well as a DSP word length, according to another embodiment of the disclosure. The radio receiver system 300 is similar to the radio receiver system 200 in FIG. 2 and comprises an antenna port 303, an RF transceiver unit 304, a digital interface unit 314 and a baseband processor unit 316. The antenna port 303 is configured to receive an RF receive signal 301 at RF frequency $f_{RF}$ from the antenna 302. The RF transceiver unit 304 is located downstream of the antenna port 303 and further comprises a receiver (Rx) front end unit 306, an analog to digital converter (ADC) unit 308, an Rx DSP unit 310, power measurement unit 328 and a quality estimation unit 312. In addition, the RF transceiver unit 204 comprises a first signal path 318 configured to convey the RF receive signal 301 at an RF frequency $f_{RF}$ from an input port 305 to the Rx front end unit 306. Further the RF transceiver unit 304 comprises a second signal path 320 configured to convey an intermediate frequency (IF) signal 319 at IF frequency $f_{IF}$ from an output of the Rx front end unit 306 to the ADC unit 308 and a third signal path 322 configured to convey a digital IF signal 321 at an output of the ADC unit 308 to the Rx DSP unit 310. Furthermore, the RF transceiver unit 304 comprises a fourth signal path 324 configured to convey a processed digital IF signal 323 at an output of the Rx DSP unit 310 to the output port 326 of the RF transceiver unit 304. Further, the baseband processor unit 316 is located downstream of the RF transceiver unit 304 and is configured to receive the processed digital IF signal 323 via the digital interface unit 314.

While the quality estimation unit 212 in FIG. 2a is only configured to dynamically adapt the digital transmission word length of the processed digital IF signal 223 over the digital interface unit 214, the quality estimation unit 312 in FIG. 3 is configured to dynamically adapt a digital transmission word length of the processed digital IF signal 323 over the digital interface unit 314 as well as dynamically adapt a DSP word length of the digital IF signal 321 used in the Rx DSP unit 310. In some embodiments, dynamically adapting the DSP word length in the Rx DSP unit 310 can comprise dynamically adapting the DSP word length of any of the signals 321, 341 or 343 respectively. To achieve this additional functionality, in some embodiments, a quality indicator unit 330 within the quality estimation unit 312 comprises a first look up table 329 comprising a plurality of predetermined digital transmission word lengths associated with a plurality of power levels of the RF receive signal 301 and a second look up table 331 comprising a plurality of predetermined DSP word lengths associated with a plurality of power levels of the RF receive signal 301. In some embodiments, the entries of the first lookup table 329 are determined based on a quality indicator, for example, SNDR of the processed digital IF signal 323 and the entries of the second look up table 331 are determined based on a quality indicator, for example, SNDR of the digital IF signal 321.

The quality indicator unit 330 further comprises a control unit 327 configured to determine the quality indicator of the processed digital IF signal 323, and the entries of the first look up table 329 based on the determined quality indicator. Further, the control unit 327 is configured to determine the quality indicator of the digital IF signal 321, and the entries of the second look up table 331 based on the determined quality indicator.

The quality estimation unit 312 further comprises a word length adaptation unit 332 configured to dynamically adapt a digital transmission word length of the processed digital IF signal 323 via a signal path 348 by selecting a digital transmission word length from the plurality of predetermined digital transmission word lengths in the first look up table 329, based on a power of the RF receive signal 301 measured in the power measurement unit 328. The power measurement unit 328 is configured to measure the power of the RF receive signal 301 in the first signal path 318. In some embodiments, the power measurement unit 328 is also configured to measure a power of the digital IF signal 321 in the third signal path 322, sampled digital IF signal 341, the processed signal 343 or the processed digital IF signal 323 in the fourth signal path 324. The word length adaptation unit 332 is further configured to dynamically adapt a DSP word length of the digital IF signal 321 via a signal path 346 by selecting a DSP word length from the plurality of predetermined DSP word lengths in the second look up table 331, based on the power of the RF receive signal 301 measured in the power measurement unit 328. In some embodiments, the power measurement unit 328 comprises an automatic gain control circuit (AGC).

As indicated above with respect to the quality estimation unit 212 in FIG. 2a, the quality estimation unit 312 is also configured to operate in two phases, namely a design phase and an operation phase. In the design phase, the quality estimation unit 312 is configured to determine the plurality of predetermined digital transmission word lengths associated with a plurality of power levels of the RF receive signal 301, that forms the entries of the first look up table 329. To achieve this, in one embodiment, the word length adaptation unit 332 successively tunes the word length of the processed digital IF signal 323 to a plurality of different word lengths to form a plurality of tuned processed IF signals. The control unit 327 within the quality indicator unit 330 then determines a quality indicator (e.g., SNDR) of one or more of the plurality of tuned processed IF signals. The control unit 327 then compares the quality indicator of each of the plurality of tuned processed IF signals to a quality indicator of the processed digital IF signal 323 for various power levels, and determines a desired digital transmission word length for each of the plurality of power levels of the RF received signal 301 based on the comparison. The quality estimation unit 312, in the design phase is further configured to determine the plurality of predetermined DSP word lengths associated with a plurality of power levels of the RF receive signal 301, that forms the entries of the second look up table 331. To achieve this, in one embodiment, the word length adaptation unit 332 successively tunes the word length of the digital IF signal 321 to a plurality of different word lengths to form a plurality of tuned digital IF signals. The control unit 327 within the quality indicator unit 330 then determines a quality indicator (i.e., SNDR) of each of the plurality of tuned digital IF signals. The quality indicator unit 330 (i.e., the control unit 327) then compares the quality indicator of each of the plurality of tuned digital IF signals to a quality indicator of the digital IF signal 321 at various power levels, and determines a desired DSP word length for each of the plurality of power levels of the RF received signal 301 based on the comparison. The design phase is usually performed (i.e., the entries of the first lookup table 329 and the second look up table 331 are determined) by the quality estimation unit 312 before the radio receiver system 300 is put into operation.

During runtime, the quality estimation unit 312 operates in the operation phase. In the operation phase, the power measurement unit 328 measures a power of the RF receive signal 301 and the word length adaptation unit 332 dynamically adapts the digital transmission word length of the processed digital IF signal 323 by selecting a digital transmission word length from the plurality of digital transmission word lengths in the first lookup table 329, based on the measured power of the RF receive signal 301 in the power measurement unit 328. Further, the word length adaptation unit 332 dynamically adapts the DSP word length of the digital IF signal 321 by selecting a DSP word length from the plurality of DSP word lengths in the second lookup table 331, based on the measured power of the RF receive signal 301 in the power measurement unit 328. Once a digital transmission word length and the DSP word lengths are selected, the quality estimation unit 312 re-enters the operation phase after a predetermined time interval. The adaptation of the digital transmission word length of the processed digital IF signal 323 is performed independent of the adaptation of the DSP word length of the digital IF signal 321. In some embodiments, the adaptation of the digital transmission word length of the processed digital IF signal 323 and the adaptation of the DSP word length of the digital IF signal 321 are performed simultaneously. However, in other embodiments, the adaptation of the digital transmission word length of the processed digital IF signal 323 and the adaptation of the DSP word length of the digital IF signal 321 are performed at different times.

Figure 4:
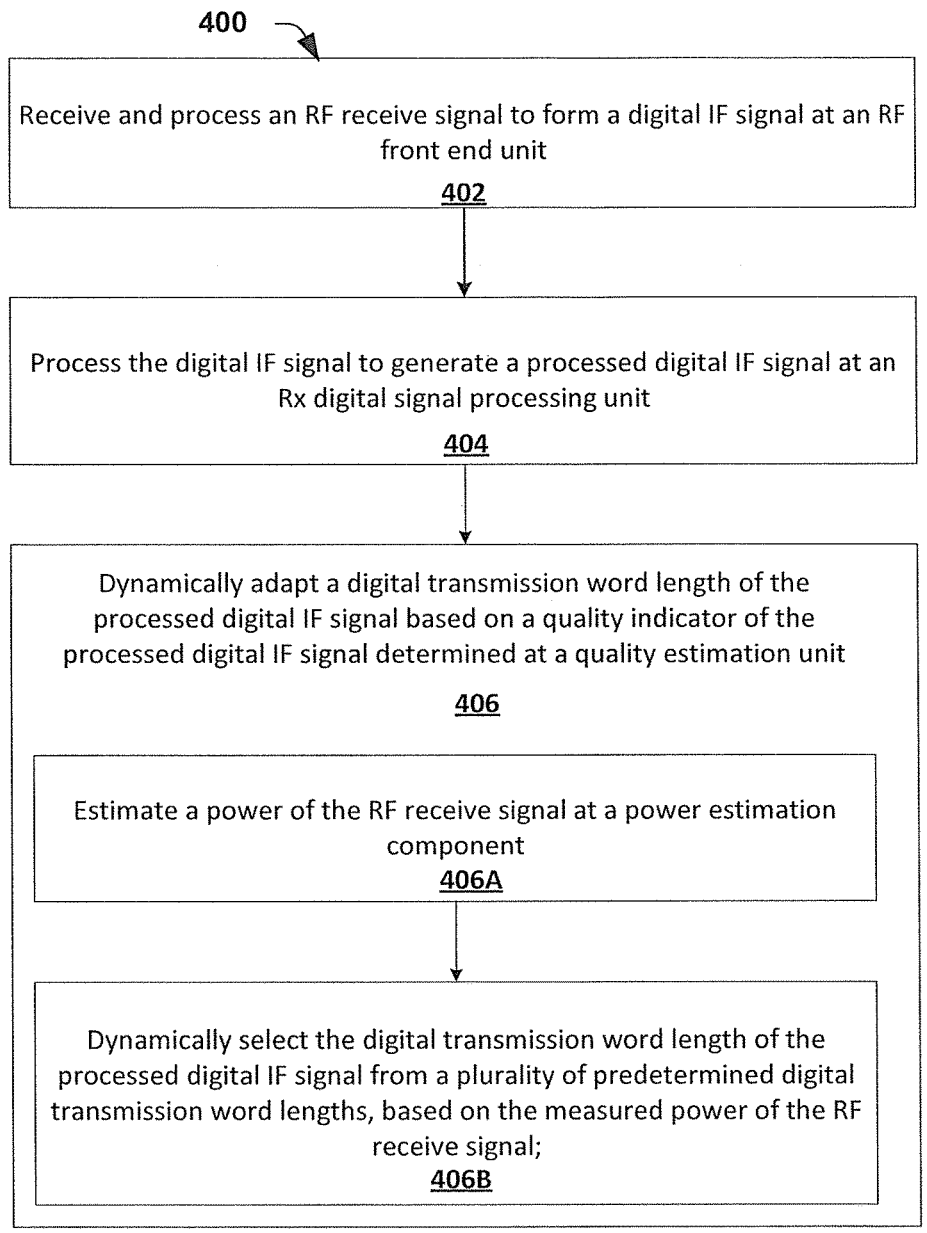
FIG. 4 shows a flowchart of a method for dynamically changing the digital transmission word length over a digital interface in a radio receiver system, according to one embodiment of the disclosure.

FIG. 4 shows a flowchart of a method 400 for dynamically changing the digital transmission word length over a digital interface in a radio receiver system, according to one embodiment of the disclosure. The method 400 is described herein with respect to the radio receiver system 200 in FIG. 2a. At 402, the RF receive signal 201 is received and processed at the Rx front end unit 206 to generate the IF signal 219 at the output of the Rx front end unit 206. Further, the IF signal 219 is digitized to generate the digital IF signal 221 at the output of the ADC unit 208. In some embodiments, the ADC unit 208 is a part of the Rx front end unit 206. At 404, the digital IF signal 221 is processed at the Rx DSP unit 210 to generate the processed digital IF signal 223 at the output of the Rx DSP unit 210. At 406, a digital transmission word length of the processed digital IF signal 223 is dynamically adjusted based on a quality indicator of the processed digital IF signal 223 determined at the quality estimation unit 230. Adapting the digital transmission word length of the processed digital IF signal 223 is achieved through 406A and 406B. At 406A, a power of the RF receive signal 201 is measured at the power measurement unit 228. At 406B, the digital transmission word length of the processed digital IF signal 223 is dynamically selected from a plurality of predetermined digital transmission word lengths in the look up table 231, based on the measured power of the RF receive signal 201.

Figure 5:
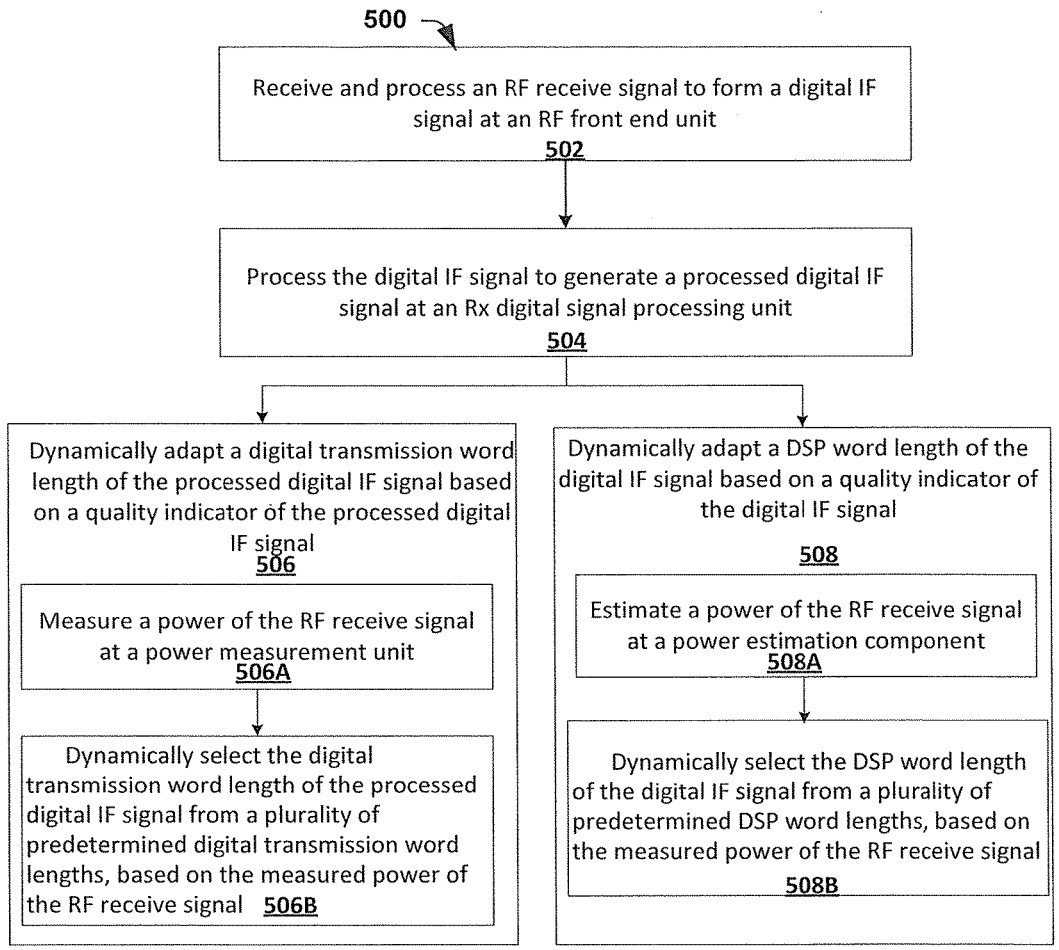
FIG. 5 shows a flowchart of a method for dynamically changing the digital transmission word length over a digital interface in a radio receiver system and the DSP word length used in a DSP section of a radio receiver system, according to another embodiment of the disclosure.

FIG. 5 shows a flowchart of a method 500 for dynamically changing the digital transmission word length over a digital interface in a radio receiver system, and dynamically changing the DSP word length used in a DSP section of a radio receiver system, according to another embodiment of the disclosure. The method 500 is described herein with respect to the radio receiver system 300 in FIG. 3. At 502, the RF receive signal 301 is received and processed at the Rx front end unit 306 to generate the IF signal 319 at the output of the Rx front end unit 306. Further, the IF signal 319 is digitized to generate the digital IF signal 321 at the output of the ADC unit 308. In some embodiments, the ADC unit 308 is a part of the Rx front end unit 306. At 504, the digital IF signal 321 is processed at the Rx DSP unit 310 to generate the processed digital IF signal 323 at the output of the Rx DSP unit 310. At 506, a digital transmission word length of the processed digital IF signal 323 is dynamically adjusted based on a quality indicator of the processed digital IF signal 323 determined at the quality estimation unit 330. Adapting the digital transmission word length of the processed digital IF signal 323 is achieved through 506A and 506B. At 506A, a power of the RF receive signal 301 is measured at the power measurement unit 328. At 506B, the digital transmission word length of the processed digital IF signal 323 is dynamically selected from a plurality of predetermined digital transmission word lengths in the first look up table 329, based on the measured power of the RF receive signal 301. In some embodiments, after 504, the method 500 proceeds to 508, wherein a DSP word length of the digital IF signal 321 is dynamically adjusted based on a quality indicator of the digital IF signal 321 determined at the quality estimation unit 330. Adapting the DSP word length of the digital IF signal 321 is achieved through 508A and 508B. At 508A, a power of the RF receive signal 301 is measured at the power measurement unit 328. At 508B, the DSP word length of the digital IF signal 321 is dynamically selected from a plurality of predetermined DSP word lengths in the second look up table 331, based on the measured power of the RF receive signal 301.

Figure 6A:
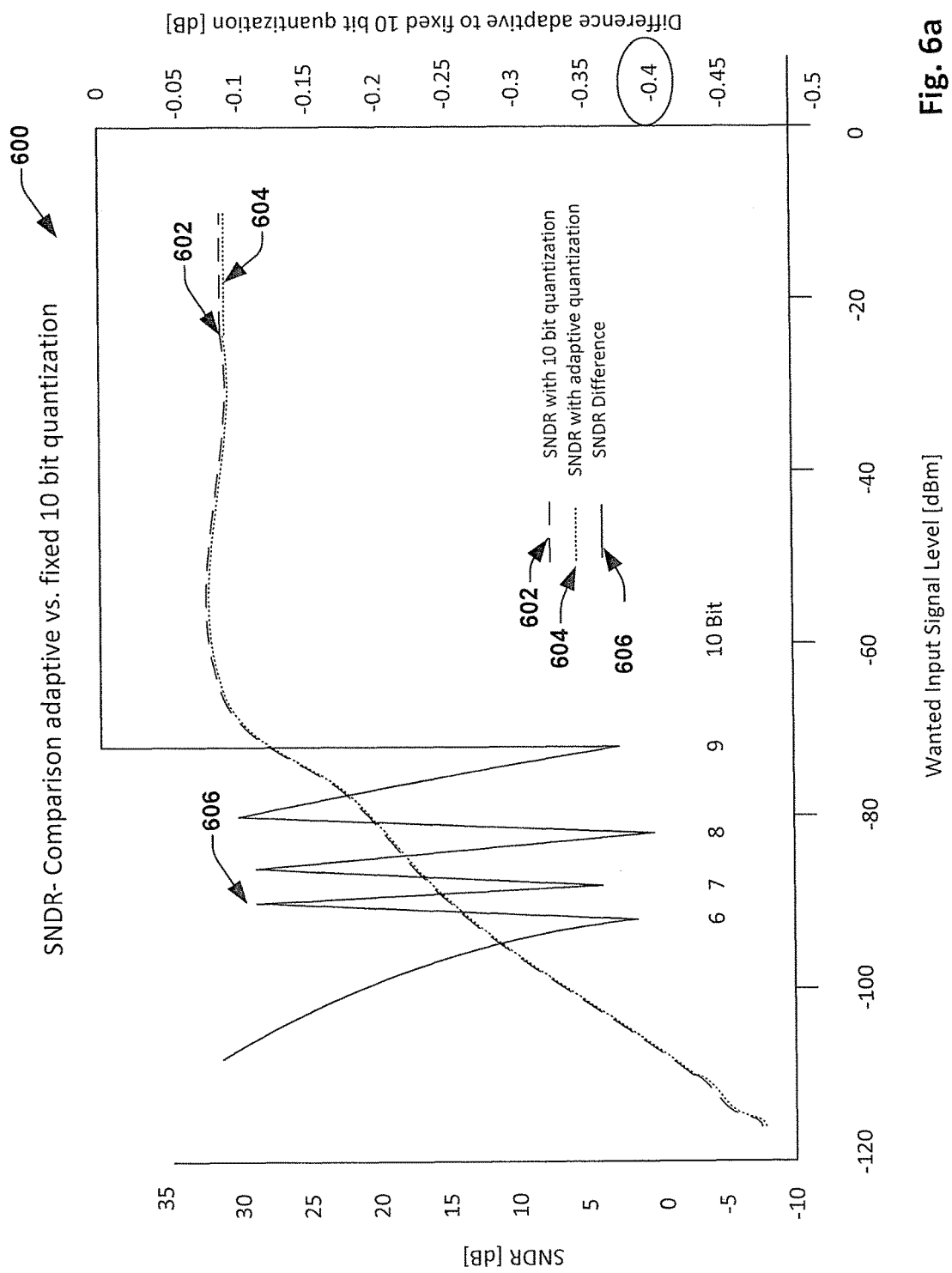
Figure 6B:
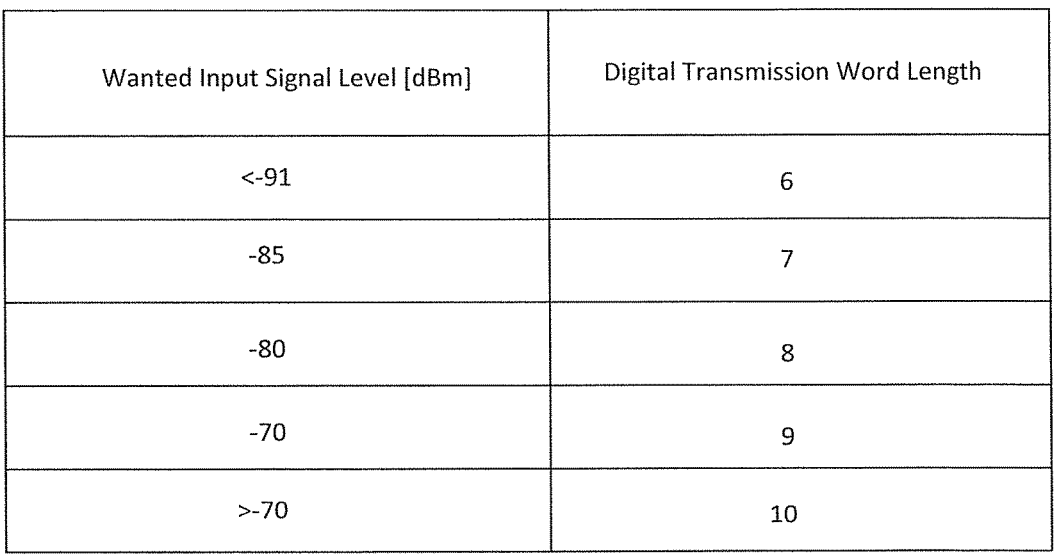

FIG. 6a shows a graph 600 showing a comparison of the SNDR of a received signal with fixed quantization and adaptive quantization, for example, in the radio receiver system 200 of FIG. 2a. The trace 602 represents the SNDR of the processed digital IF signal 223 with fixed word length (e.g., 10 bit) associated with the RF receive signal 201 over a plurality of power levels. The trace 604 represents the SNDR of the dynamically adapted processed digital IF signal having an adaptive word length over the plurality of power levels. For example, for the range >−70 dBm of the RF receive signal strength, the digital transmission word length is fixed (i.e., 10 bit), for the range −70 dBm to −80 dBm, the digital transmission word length is 9 bit and so on. The trace 606 represents the difference in SNDR with fixed word length vs adaptive word length at each of the power levels of the RF receive signal 201. FIG. 6b shows an example implementation of the look up table 231 of FIG. 2a derived based on the graph of FIG. 6a.

Figure 7:
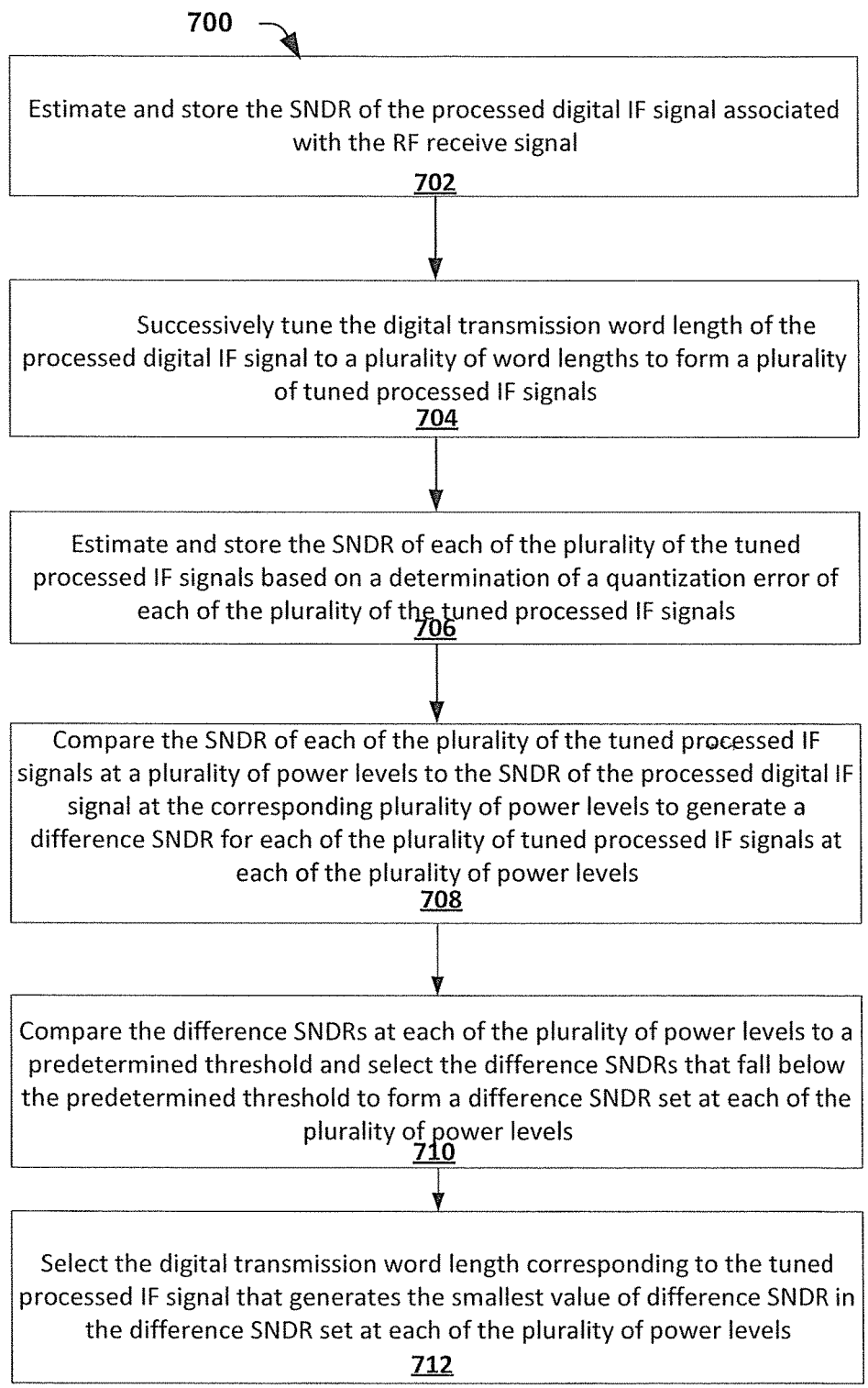
FIG. 7 shows an example implementation of an algorithm for determining a plurality of predetermined digital transmission word lengths corresponding to a plurality of input power levels, according to one embodiment of the disclosure.

FIG. 7 shows an example implementation of an algorithm 700 for estimating the plurality of predetermined digital transmission word lengths associated with a plurality of power levels of the RF receive signal 201 in the look up table 231 of FIG. 2a, according to one embodiment of the disclosure. The algorithm 700 is described herein with respect to the FIG. 2a, FIGS. 6a and 6b respectively. At 702, an SNDR of the processed digital IF signal 223 of FIG. 2a is determined based on the power measurements of the power measurement unit 228 and a knowledge of the overall receiver performance characteristic. At 704, the digital transmission word length of the processed digital IF signal 223 is dynamically tuned to a plurality of word lengths to form a plurality of tuned processed IF signals. At 706, SNDR of each of the plurality of the tuned processed IF signals are determined based on a determination of a quantization error of each of the plurality of the tuned processed IF signals. At 708, the SNDR of each of the plurality of the tuned processed IF signals at a plurality of power levels (for example, −120 dBm to 0 dBm in FIG. 6a) is compared to the SNDR of the processed digital IF signal at the corresponding plurality of power levels to generate a difference SNDR for each of the plurality of tuned processed IF signals at each of the plurality of power levels. At 710, the difference SNDRs at each of the plurality of power levels is compared to a predetermined threshold (for example, 0.4 dB in FIG. 6a) and the difference SNDRs that fall below the predetermined threshold are selected to form a difference SNDR set at each of the plurality of power levels. At 712, the digital transmission word length corresponding to the tuned processed IF signal that generates the smallest value of difference SNDR in the difference SNDR set at each of the plurality of power levels is selected to form the plurality of predetermined digital transmission word lengths in look up table 231 of FIG. 2a. For example, in the graph 600, between −70 dBm and −80 dBm, a word length of 9 bits is chosen for the digital transmission word length and between −80 dBm and −85 dBm, a word length of 8 bits is chosen for the digital transmission word length. Further, as can be seen from the graph 600, with a word length of 9 bits (between −70 dBm and −80 dBm) and with a word length of 8 bits (between −80 dBm and −85 dBm), the SNDR difference falls below the predetermined threshold of 0.4 dB. The algorithm 700 can also be used to determine the plurality of predetermined digital transmission word lengths associated with a plurality of power levels of the RF receive signal 301 in the first look up table 329 of FIG. 3. Further, in some embodiments, the algorithm 700 can also be used to determine the plurality of predetermined DSP word lengths associated with a plurality of power levels of the RF receive signal 301 in the second look up table 331 of FIG. 3. However, in such embodiments, the plurality of predetermined DSP word lengths are determined based on the SNDR calculations of the digital IF signal 321 or the signals 341, 343 of the Rx DSP unit 310, rather than the processed digital IF signal 323 used in the determination of the plurality of predetermined digital transmission word lengths.

While the methods are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to perform acts of the method or of an apparatus or system for concurrent communication using multiple communication technologies according to embodiments and examples described herein.

Example 1 is a radio frequency (RF) transceiver system, comprising: an input port configured to receive an RF receive signal; a receiver (RX) digital signal processing (DSP) unit configured to process a digital intermediate frequency (IF) signal based on the RF receive signal and generate a processed digital IF signal at an output port based thereon; a digital interface unit comprising a digital interface configured to convey the processed digital IF signal from the output port to a baseband unit; and a quality estimation unit configured to estimate a quality indicator of the RF receive signal or a signal associated therewith and dynamically adapt a digital transmission word length of the processed digital IF signal over the digital interface, based on the estimated quality indicator.

Example 2 is a system including the subject matter of example 1, wherein the quality estimation unit further comprises a quality indicator unit comprising a first look up table comprising a plurality of predetermined digital transmission word lengths associated with a plurality of power levels of the RF receive signal, wherein entries of the first look up table are determined based on a quality metric of the processed digital IF signal.

Example 3 is a system including the subject matter of examples 1-2, including or omitting elements, wherein the quality estimation unit is further configured to dynamically adapt a DSP word length of the digital IF signal used in the Rx DSP unit, based on the estimated quality indicator.

Example 4 is a system including the subject matter of examples 1-3, including or omitting elements, wherein the quality indicator unit further comprises a second look up table comprising a plurality of predetermined DSP word lengths associated with a plurality of power levels of the RF receive signal, wherein entries of the second look up table are determined based on a quality metric of the digital IF signal.

Example 5 is a system including the subject matter of examples 1-4, including or omitting elements, wherein the quality estimation unit further comprises a word length adaptation unit configured to dynamically select a digital transmission word length of the processed digital IF signal over the digital interface from the plurality of predetermined digital transmission word lengths in the first look up table, based on a power of the RF receive signal.

Example 6 is a system including the subject matter of examples 1-5, including or omitting elements, wherein the word length adaptation unit is further configured to dynamically select the DSP word length of the digital IF signal in the Rx DSP unit from the plurality of predetermined DSP word lengths in the second lookup table, based on the power of the RF receive signal.

Example 7 is a system including the subject matter of examples 1-6, including or omitting elements, further comprising a power measurement unit configured to measure the power of the RF receive signal.

Example 8 is a system including the subject matter of examples 1-7, including or omitting elements, wherein the quality estimation unit is configured to operate in a design phase wherein the quality indicator unit determines the plurality of predetermined digital transmission word lengths for a plurality of power levels of the RF receive signal in the first lookup table, by successively tuning the digital transmission word length of the processed digital IF signal to a plurality of different word lengths to form a plurality of tuned processed IF signals, determining a quality metric of each of the plurality of tuned processed IF signals, and determining a desired word length of the processed digital IF signal corresponding to a particular power level of the RF receive signal based on a comparison between the quality metric of the processed digital IF signal and the quality metrics of each of the plurality of tuned processed IF signals.

Example 9 is a system including the subject matter of examples 1-8, including or omitting elements, wherein the quality estimation unit is further configured to operate in an operation phase wherein the power measurement unit measures the power of the RF receive signal, and the word length adaptation unit dynamically adapts the digital transmission word length of the processed digital IF signal over the digital interface by selecting a digital transmission word length from the plurality of digital transmission word lengths in the first look up table, based on the measured power of the RF receive signal.

Example 10 is a system including the subject matter of examples 1-9, including or omitting elements, wherein the quality indicator unit, in the design phase further determines the plurality of predetermined DSP word lengths for a plurality of power levels of the RF receive signal in the second look up table, by successively tuning the DSP word length of the digital IF signal to a plurality of word lengths to form a plurality of tuned digital IF signals, determining a quality metric of each of the plurality of tuned digital IF signals, and determining a desired word length of the digital IF signal corresponding to a particular power level of the RF receive signal based on a comparison between the quality metric of the digital IF signal and the quality metrics of each of the plurality of tuned digital IF signals.

Example 11 is a system including the subject matter of examples 1-10, including or omitting elements, further dynamically adapts the DSP word length of the digital IF signal over the digital interface by selecting a DSP word length from the plurality of DSP word lengths in the second look up table, based on the measured power of the RF receive signal.

Example 12 is a system including the subject matter of examples 1-11, including or omitting elements, wherein the quality indicator comprises a signal-to-noise and distortion ratio (SNDR).

Example 13 is a system including the subject matter of examples 1-12, including or omitting elements, wherein the quality indicator of the RF receive signal is estimated based on one or more of a power of the RF receive signal, a requested transceiver gain and a used modulation scheme.

Example 14 is a system including the subject matter of examples 1-13, including or omitting elements, wherein the quality estimation unit is further configured to derive an algorithm that maps one or more of a power of the RF receive signal, a requested transceiver gain by the baseband unit and a used modulation scheme to the digital transmission word length based on the estimated quality indicator.

Example 15 is a radio frequency (RF) transceiver system, comprising: an input port configured to receive an RF receive signal; a receiver (RX) digital signal processing (DSP) unit configured to process a digital intermediate frequency (IF) signal based on the RF receive signal and generate a processed digital IF signal at an output port based thereon; a digital interface unit comprising a digital interface configured to convey the processed digital IF signal from the output port to a baseband unit; and a quality estimation unit configured to estimate a quality indicator of the RF receive signal or a signal associated therewith and dynamically adapt a DSP word length of the digital IF signal used in the Rx DSP unit, based on the estimated quality indicator.

Example 16 is a system including the subject matter of example 15, wherein the quality estimation unit further comprises a quality indicator unit comprising a first look up table comprising a plurality of predetermined DSP word lengths associated with a plurality of power levels of the RF receive signal, wherein entries of the first look up table are determined based on a quality metric of the digital IF signal.

Example 17 is a system including the subject matter of examples 15-16, including or omitting elements, wherein the quality estimation unit is further configured to dynamically adapt a digital transmission word length of the processed digital IF signal over the digital interface, based on the estimated quality indicator of the RF receive signal or the signal associated therewith.

Example 18 is a system including the subject matter of examples 15-17, including or omitting elements, wherein the quality indicator unit further comprises a second look up table comprising a plurality of predetermined digital transmission word lengths associated with a plurality of power levels of the RF receive signal, wherein entries of the second look up table are determined based on a quality metric of the processed digital IF signal.

Example 19 is a system including the subject matter of examples 15-18, including or omitting elements, wherein the quality estimation unit further comprises a word length adaptation unit configured to dynamically select a DSP word length of the digital IF signal in the Rx DSP unit from the plurality of predetermined DSP word lengths in the second lookup table, based on a power of the RF receive signal.

Example 20 is a system including the subject matter of examples 15-19, including or omitting elements, wherein the word length adaptation unit is further configured to dynamically select a digital transmission word length of the processed digital IF signal over the digital interface from the plurality of predetermined digital transmission word lengths in the second lookup table, based on the power of the RF receive signal.

Example 21 is a system including the subject matter of examples 15-20, including or omitting elements, wherein the quality indicator comprises a signal-to-noise and distortion ratio (SNDR).

Example 22 is a method for operating a radio frequency (RF) transceiver system comprising: receiving and processing an RF receive signal to form a digital intermediate frequency (IF) signal at an RF front end unit; processing the digital IF signal to generate a processed digital IF signal at a receiver (Rx) digital signal processing (DSP) unit; dynamically adapting a digital transmission word length of the processed digital IF signal for subsequent transmission over a digital interface, based on a quality indicator of the RF receive signal or a signal associated therewith; and transmitting the dynamically adapted processed digital IF signal over the digital interface.

Example 23 is a method including the subject matter of example 22, further comprising: receiving one or more of the RF receive signal, a requested transceiver gain and a used modulation scheme, and estimating a quality indicator of the RF receive signal or a signal associated therewith based thereon; and determining an algorithm that maps the one or more of a power of the RF receive signal, the requested transceiver gain and the used modulation scheme to the digital transmission word length based on the estimated quality indicator.

Example 24 is a method including the subject matter of examples 22-23, including or omitting elements, further comprising; dynamically adapting a DSP word length of the digital IF signal in the Rx DSP unit, based on a quality indicator of the RF receive signal or a signal associated therewith.

Example 25 is a method including the subject matter of examples 22-24, including or omitting elements, wherein dynamically adapting the digital transmission word length of the processed digital IF signal over a digital interface comprises: dynamically selecting the digital transmission word length of the processed digital IF signal from a plurality of predetermined digital transmission word lengths, based on a measured power of the RF receive signal; wherein the plurality of predetermined digital transmission word lengths are determined based on a quality metric of the processed digital IF signal.

Example 26 is a method including the subject matter of examples 22-25, including or omitting elements, wherein dynamically adapting a DSP word length of the digital IF signal in the Rx DSP unit comprises: dynamically selecting the DSP word length of the digital IF signal in the Rx DSP unit from a plurality of predetermined DSP word lengths, based on a measured power of the RF receive signal; wherein the plurality of predetermined DSP word lengths are determined based on a quality metric of the digital IF signal.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature may have been disclosed with respect to only one of several implementations, such feature may be combined with one or more other features of the other implementations as may be desired and advantageous for any given or particular application.

The invention claimed is:
1. A radio frequency (RF) transceiver system, comprising:
an input port configured to receive an RF receive signal;
a receiver (RX) digital signal processing (DSP) unit configured to process a digital intermediate frequency (IF) signal based on the RF receive signal and generate a processed digital IF signal at an output port based thereon;
a digital interface unit comprising a digital interface configured to convey the processed digital IF signal from the output port to a baseband unit; and
a quality estimation unit configured to estimate a quality indicator of the RF receive signal or a signal associated therewith, and dynamically adapt a DSP word length of the digital IF signal used in the Rx DSP unit and a digital transmission word length of the processed digital IF signal over the digital interface, based on the estimated quality indicator.

2. The system of claim 1, wherein the quality estimation unit further comprises a quality indicator unit comprising a first look up table comprising a plurality of predetermined DSP word lengths associated with a plurality of power levels of the RF receive signal, wherein entries of the first look up table are determined based on a quality metric of the digital IF signal.

3. The system of claim 2, wherein the quality indicator unit further comprises a second look up table comprising a plurality of predetermined digital transmission word lengths associated with a plurality of power levels of the RF receive signal, wherein entries of the second look up table are determined based on a quality metric of the processed digital IF signal.

4. The system of claim 3, wherein the quality estimation unit further comprises a word length adaptation unit configured to dynamically select a DSP word length of the digital IF signal in the Rx DSP unit from the plurality of predetermined DSP word lengths in the second lookup table, based on a power of the RF receive signal.

5. The system of claim 4, wherein the word length adaptation unit is further configured to dynamically select a digital transmission word length of the processed digital IF signal over the digital interface from the plurality of predetermined digital transmission word lengths in the second lookup table, based on the power of the RF receive signal.

6. The system of claim 1, wherein the quality indicator comprises a signal-to-noise and distortion ratio (SNDR).

7. A method for operating a radio frequency (RF) transceiver system, comprising:
receiving and processing an RF receive signal to form a digital intermediate frequency (IF) signal at an RF front end unit;
processing the digital IF signal to generate a processed digital IF signal at a receiver (Rx) digital signal processing (DSP) unit;
transmitting the generated processed digital IF signal using a digital interface unit comprising a digital interface;

dynamically adapting a DSP word length of the digital IF signal in the Rx DSP unit, based on a quality indicator of the RF receive signal or a signal associated therewith; and dynamically adapting a digital transmission word length of the processed digital IF signal over the digital interface, based on the quality indicator.

8. The method of claim 7, further comprising:

receiving one or more of the RF receive signal, a requested transceiver gain and a used modulation scheme, and estimating the quality indicator of the RF receive signal or a signal associated therewith based thereon; and determining an algorithm that maps the one or more of a power of the RF receive signal, the requested transceiver gain and the used modulation scheme to the digital transmission word length based on the estimated quality indicator.

9. The method of claim 7, wherein dynamically adapting the digital transmission word length of the processed digital IF signal over the digital interface comprises:

dynamically selecting the digital transmission word length of the processed digital IF signal from a plurality of predetermined digital transmission word lengths, based on a measured power of the RF receive signal;

wherein the plurality of predetermined digital transmission word lengths are determined based on a quality metric of the processed digital IF signal.

10. The method of claim 7, wherein dynamically adapting a DSP word length of the digital IF signal in the Rx DSP unit comprises:

dynamically selecting the DSP word length of the digital IF signal in the Rx DSP unit from a plurality of predetermined DSP word lengths, based on a measured power of the RF receive signal;

wherein the plurality of predetermined DSP word lengths are determined based on a quality metric of the digital IF signal.

* * * * *